United States Patent [19]

Imgram

[11] Patent Number: 4,783,303

[45] Date of Patent: Nov. 8, 1988

[54] METHOD OF PROCESSING SEMIFINISHED PRODUCTS MADE OF CROSS-LINKED PLASTIC MATERIAL

[75] Inventor: Friedrich Imgram, Heusenstamm, Fed. Rep. of Germany

[73] Assignee: Wirsbo Pex Platzer Schwedenbau GmbH, Fed. Rep. of Germany

[21] Appl. No.: 23,041

[22] PCT Filed: Mar. 14, 1986

[86] PCT No.: PCT/EP86/00141

§ 371 Date: Nov. 4, 1986

§ 102(e) Date: Nov. 4, 1986

[87] PCT Pub. No.: WO86/05440

PCT Pub. Date: Sep. 25, 1986

[30] Foreign Application Priority Data

Mar. 14, 1985 [DE] Fed. Rep. of Germany ....... 3509119

[51] Int. Cl.⁴ .................. B29C 49/00; B29C 65/02
[52] U.S. Cl. ................................. 264/535; 264/230; 264/249; 264/322; 264/331.17; 264/510; 264/523; 264/573
[58] Field of Search ............... 264/322, 331.17, 297.5, 264/296, 534, 523, 510, 535, 573, 286, 287, 249, 236; 425/DIG. 218

[56] References Cited

U.S. PATENT DOCUMENTS

| | | | |
|---|---|---|---|
| 2,232,475 | 2/1941 | Renfrew et al. | 264/331.17 |
| 3,418,409 | 12/1968 | Hesse et al. | 264/322 |
| 3,576,933 | 4/1971 | Batis et al. | 264/523 |
| 4,135,961 | 1/1979 | Yoshizawa et al. | 264/322 |
| 4,156,710 | 5/1979 | Carroll et al. | 264/322 |
| 4,332,767 | 6/1982 | Kitanoha et al. | 264/319 |

FOREIGN PATENT DOCUMENTS

| | | | |
|---|---|---|---|
| 3001513 | 7/1981 | Fed. Rep. of Germany | 264/322 |
| 73968 | 6/1977 | Japan | 264/523 |
| 7407585 | 12/1975 | Netherlands | 264/322 |

*Primary Examiner*—James Lowe
*Attorney, Agent, or Firm*—Lee & Smith

[57] ABSTRACT

The cross-linked plastic material is shaped in the softened state, for example, by blow-molding, deep-drawing, pressing, rolling, calendering or stretching and cooled below the softening range while retaining the thus formed shape.

7 Claims, 5 Drawing Sheets

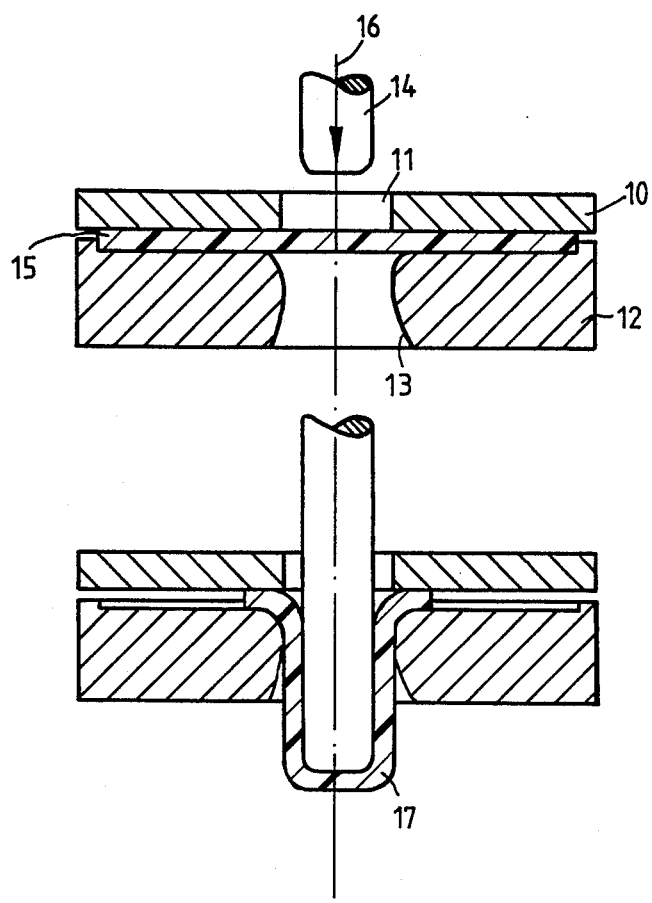

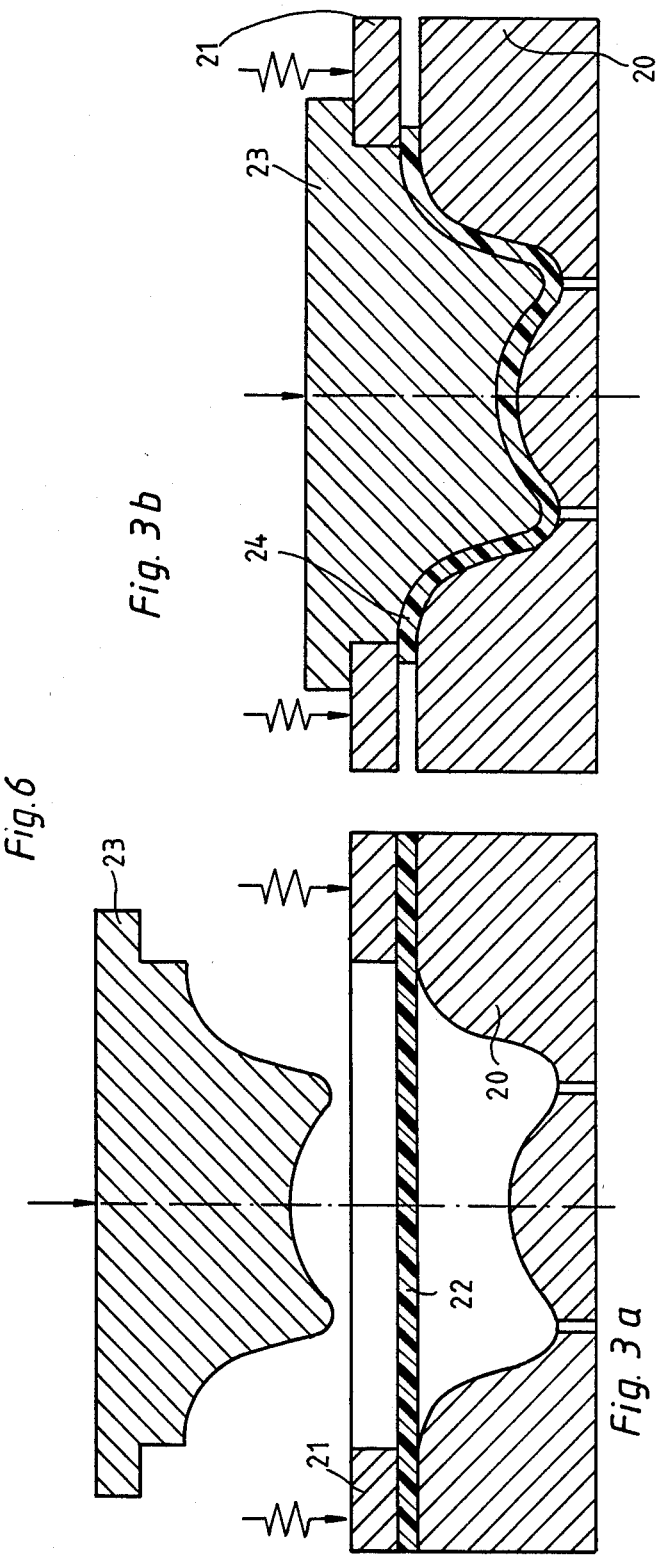
Fig. 3b
Fig. 3a
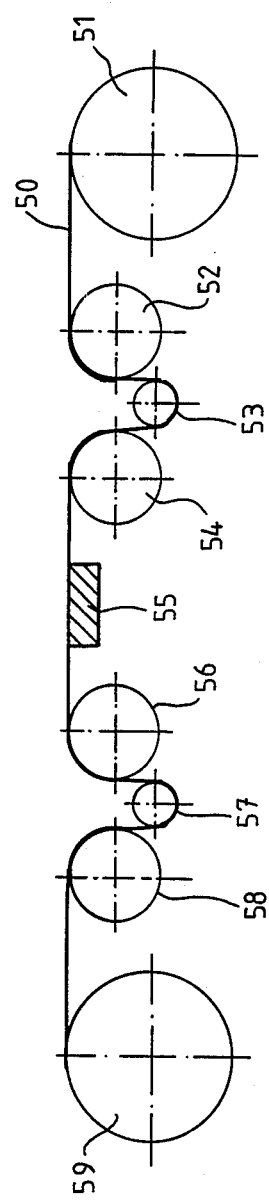
Fig. 6

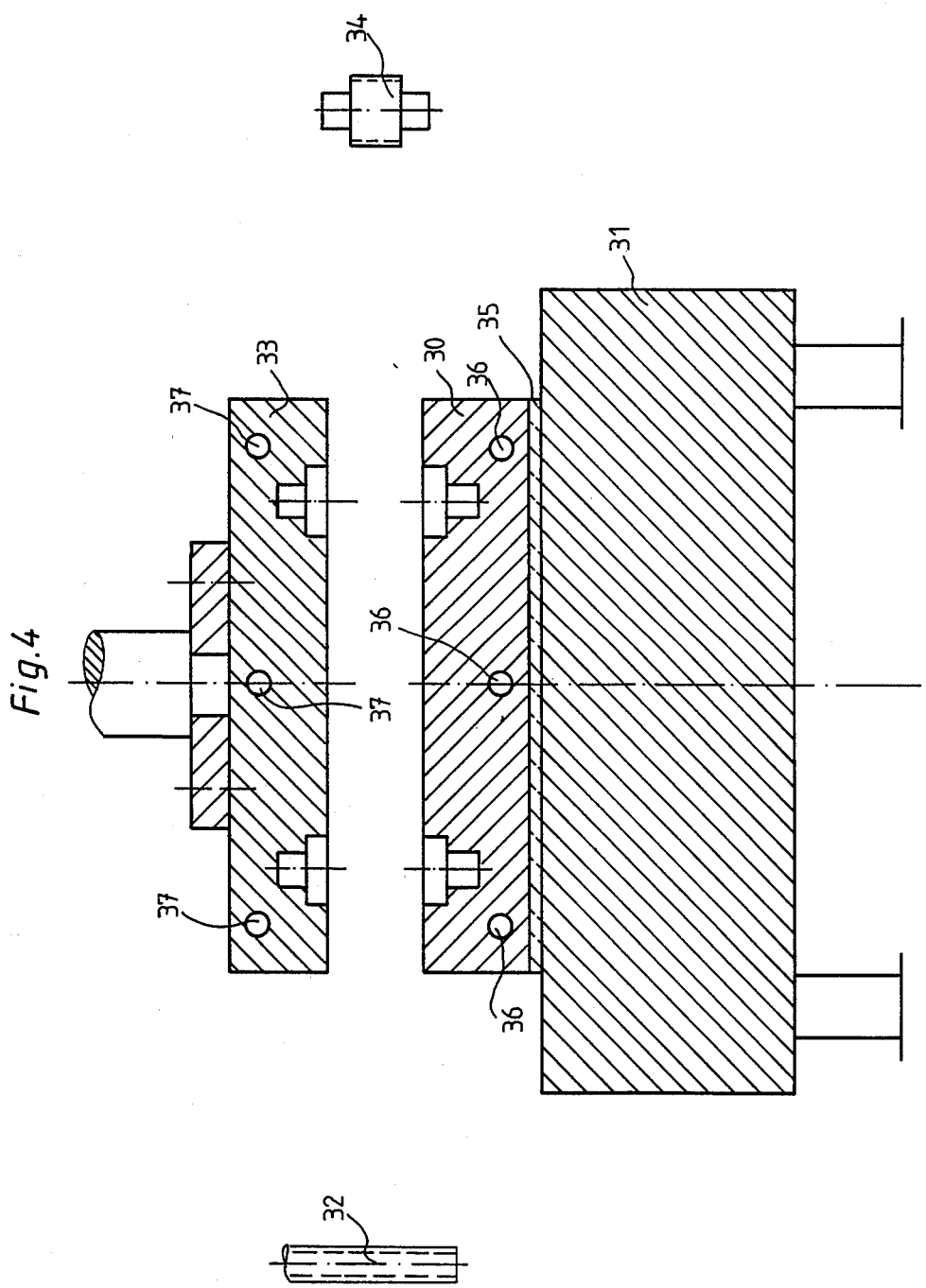

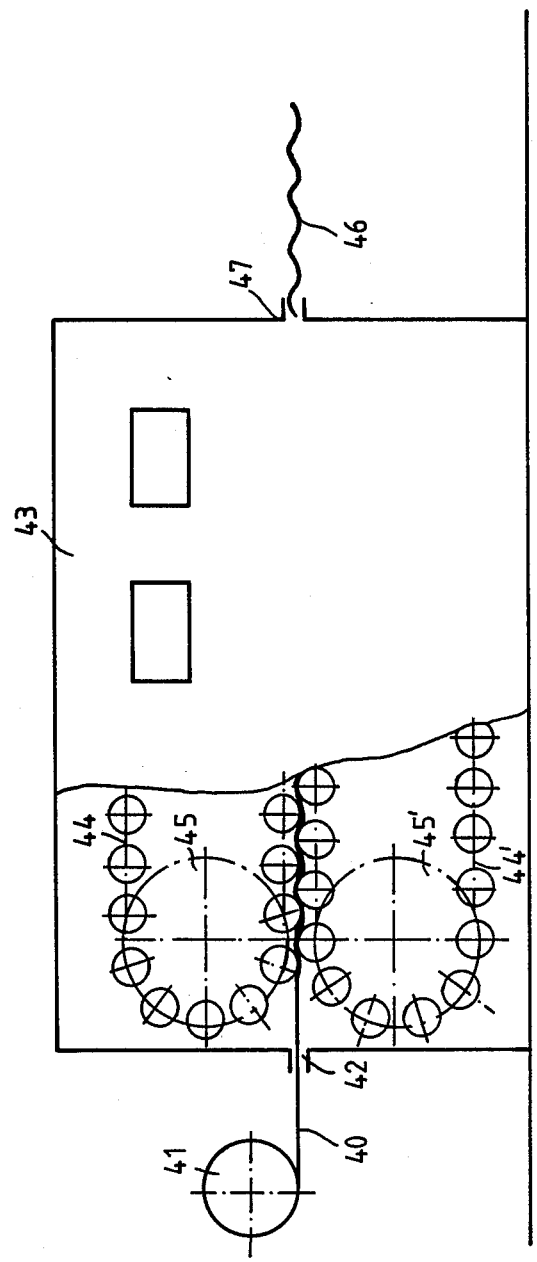

METHOD OF PROCESSING SEMIFINISHED PRODUCTS MADE OF CROSS-LINKED PLASTIC MATERIAL

TECHNICAL FIELD

The invention relates to a method of processing semifinished products made of thermoelastic cross-linked plastic material.

BACKGROUND OF INVENTION

Semifinished products, particularly tubes made of cross-linked polyolefins are obtained using, for example, an extrusion method, see German Pat. No. 1,679,826 and European Pat. No. 0,003,587. Processing of such material is relatively difficult due to its high stiffness. Thus it has been proposed, see, for example, European Patent Application No. 82,100,466.0, to shape semifinished products made of tubes by stretching the tube during its production and subsequently heating the tube to a temperature above the crystallite melting point for the shaping operation. During this operation the tube re-assumesits original nonstretched form and thereby is able to adapt to suitable respectively presented molds. Since the cross-linked material is difficult to process there existed hitherto the tendency of carrying out the cross-linking during or after shaping. Consequently, the advantageous properties of the cross-linked material could only be utilized for the limited number of products which could be produced in this manner.

DISCLOSURE OF THE INVENTION

Surprisingly it has now been found that semifinished products made of thermoelastic cross-linked plastic materials like polyolefins can be relatively readily shaped in the softened state using conventional shaping methods but retains, even through long service periods, the shape which has been impressed at the higher temperature, after cooling below the softening range of the cross-linked plastic material. It has further been found that this shape is stable over wide ranges of temperature so that articles formed, for example, from cross-linked polyethylene are dimensionally stable in the temperature range of $-100°$ C. to $+130°$ C. On reheating through the softening range of the cross-linked plastic material, the shaped product looses its impressed shape because the material which is heated to such high temperature, tends to re-assume the original shape of the semifinished product due to its rubber elasticity.

It is the object of the present invention to indicate methods of shaping semifinished products made of thermoelastic cross-linked plastic materials.

According to the invention this object is achieved by heating up the semifinished product to the softened state of the cross-linked plastic material, shaping the semifinished product in the heated state and cooling the semifinished product while retaining the thus formed shape to a temperature below the softening range.

Semifinished products made of cross-linked polyolefin are heatedfor shaping to a temperature above the crystallite melting point and, after shaping, cooled to a temperature below the crystallite melting point.

Shaping can be effected by blow molding, deep-drawing, pressing, rolling or calendering or also by stretching or orienting in one or more axes. Particularly and according to the inventive method, for example, the flexibility of tubes made of cross-linked polyolefins can be significantly increased. For this purpose, a predetermined section of the tube is shaped in the softened state in a blowing mold such that annular beads are formed in this section which annular beads increase the flexibility of the tube in this section.

Furthermore, the product which is obtained from the semifinished product by blow molding, can be provided by further mechanical processing with openings such as holes or slots in those regions which have been widened by the blow molding operation. In such shaped and further processed products the changes caused by the blow molding operation and thus also the changes produced by the further processing can be entirely or partially reversed by reheating the further processed product to a temperature range in the softening range of the cross-linked plastic material. The processing of the material thereby can be effected under more favorable conditions considering the properties of the processing tools.

Plug-type connections between tubes made of cross-linked polyolefins can be obtained in a simple manner by providing the semifinished product in the form of tubes in the softened state with beads which remain after cooling to temperatures below the softening stage. During this operation the beads are formed such that the tubes which are telescoped into each other, are interconnected by the beads.

According to a further advantageous development of the method according to the invention the semifinished product is connected by the shaping operation to another article in the heated, i.e. softened state of the cross-linked plastic material. After cooling below the softening range there is formed a firmly bonding connection between the semifinished product and the other article which may constitute, for example, a mounting, a connective element or a slide rail.

In a further advantageous use ofthe inventive method, a semifinished product in the form of a tube is heated to softening at one end and placed at a tube connecting element in the softened state. In this manner there is obtained after cooling a firm and sealing connection between the tube and the tube connecting element.

Altogether the inventive method renders possible the manufacture of articles which cannot be produced or which can be produced only with difficulties immediately or by later cross-linking. According to the invention there can be manufactured specifically shaped individual parts as well as industrially manufactured mass products and during such operations relatively low shaping energies and sufficiently brief cycling times can be achieved by selecting proper temperature conditions. The manufactured products possess high service lives at temperatures sufficiently below the shaping temperature. For certain purposes of use, however, even the tendency to re-form the original shape at elevated temperatures can be utilized with advantage.

BRIEF DESCRIPTION OF THE DRAWINGS

A number of exemplary embodiments using the inventive method are explained and described in detail hereinbelow with reference to the associated drawings and to the reference characters. There are shown in:

FIGS. 2a and 2b a section through a schematically illustrated deep-drawing die in different steps of a second exemplary embodiment of the inventive method;

FIGS. 3a and 3b a section through a schematically illustrated pressing die in different steps of a third exemplary embodiment of the inventive method;

FIG. 4 a section through a schematically illustrated pressing die for producing a press fitting according to the inventive method;

FIG. 5 a schematic illustration, partially in section, of a section rolling mill for carrying out a fourth exemplary embodiment of the inventive method;

FIG. 6 a section through a schematically illustrated stretching unit for carrying out a fifth exemplary embodiment of the inventive method.

PREFERRED MODES FOR CARRYING OUT THE INVENTION

The semifinished products in the described exemplary embodiments generally are made of thermoelastic cross-linked plastic material and particularly of chemically cross-linked polyolefins manufactured according to the initially mentioned extrusion process. The same results can also be obtained using radiation chemically cross-linked polyolefin as well as semifinished products made of other thermoelastic cross-linked plastic materials.

Figure 1A:
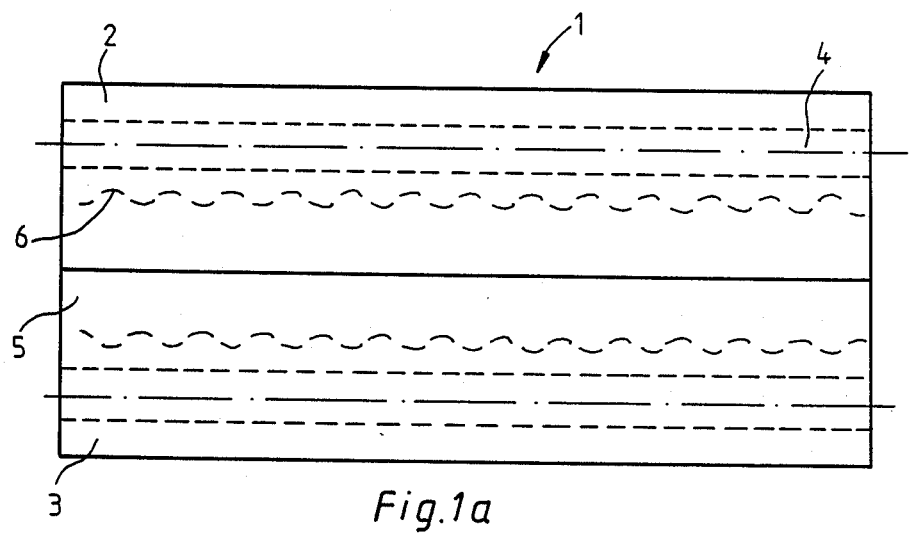
FIGS. 1a and 1b, respectively, schematically a longitudinal section and a cross-section through a blow molding tool for carrying out a first exemplary embodiment of the inventive method.
Figure 1B:
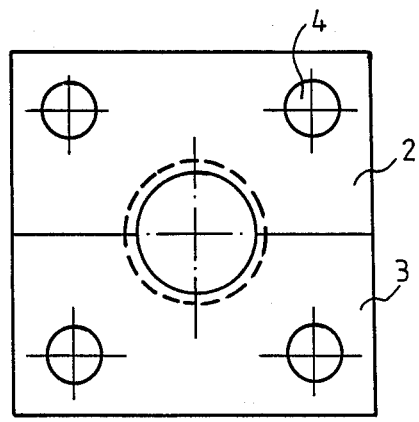

An exemplary embodiment of a blow mold 1 for producing tubes containing predetermined sections of increased flexibility is respectively shown in longitudinal section as well as in cross-section in FIGS. 1a and 1b. The blow mold 1 contains two semi-molds 2 and 3 which define a mold cavity 5 therebetween in the assembled state. The semi-molds 2 and 3 are held together in a suitable manner, for example, by threaded connections or in a hydraulicmanner. Passages 4 extend through the semi-molds 2 and 3 and can be supplied with a heating medium or a cooling medium depending upon the requirements. In the illustrated exemplary embodiment the mold cavity 5 extends through the blow mold 1 along the lengthwise axis and the internal wall of the mold cavity 5 is provided with an undulating structure or corrugated profile 6 extending transversely to the lengthwise axis of the blow mold 1 i.e. the blow mold 1 contains corrugated walls.

For carrying out the blow molding operation, a predetermined section of a not particularly illustrated tube made of thermoelastic cross-linked plastic material is placed into the blow mold 1; the passages 4 of the blow mold 1 are connected to a heating medium and the blow mold 1 is heated to a temperature in the softening range of the cross-linked plastic material. The tube section, however, can also be placed in a preheated state into an already preheated blow mold of the type as the blow mold 1. The shaping is effected by subjecting the tube to an internal pressure under the action of which the tube wall is pressed against the undulating structure 6 of the internal wall of the blow mold 1. During this operation the tube can be subjected to the required internal pressure using different modes of operation which are known as such. One such mode of operation comprises, for example, pressure-tightly closing the tube at one end by means of a plug and pressure-tightly connecting the tube at the other end to a pressure source. Another mode of operation, for example, comprises pressure-tightly connecting the tube at one end to a pressure source and pressure-tightly closing the tube at the other end by means of a squeeze edge formed at the semi-molds 2 and 3. After the shaping operation the shaped tube is left to cool in the blow mold 1; during this operation, for example, a cooling agent can be passed through the passages 4. The shaped tube which is provided with annular beads in the preselected section, is removed from the blow mold 1 after cooling below the softening range of the plastic material.

In corresponding manner the shaping also can be effected by providing the preheated tube with a suitably constructed internal mold and evacuating the tube. The evacuated tube is then externally subjected to air pressure in order to carry out the shaping operation.

An exemplary embodiment for shaping semifinished products made of cross-linked polyolefin using a deep-drawing operation is schematically explained in FIGS. 2a and 2b. A one-ply or multiple-ply plate 15 is preheated to a temperature in the softening range of the cross-linked plastic material in a hot cabinet, by means of an infrared radiator or other means known as such and clamped between a top member 10 and a base member 12 of a deep-drawing die. If required, the top member 10 and the base member 12 can also be preheated to a temperature range within the softening range or heated to such temperature range. The top member 10 and the base member 12 are provided with respective preformed gaps 11 and 13 in a manner which is known in principle and a deep-drawing plunger 14 is aligned thereto. The deep-drawing plunger 14 is brought to act upon the plate 15 with a force indicated by the arrow 16 and during this action the plate 15 is deformed as shown in FIG. 2b. After cooling below the softening range of the cross-linked plastic material, the shaped article 17 is removed from the deep-drawing die.

In this manner elements madeof, for example, cross-linked polyethylene can be manufactured and such elements find use in refrigeration technology, for example, in deep-freeze transport containers, deep-freezers and others due to their high cold-resistance down to $-100°$ C. at which they are not susceptible to stress cracking. Such elements, however, can also be shaped as cable covers for underground cables and also as automobile bumpers or fenders.

In a corresponding manner semifinished products made of cross-linked plastic material can be shaped in pressing dies of conventional type of construction at temperatures in the softening range and subsequently cooled below this temperature. In this manner, for example, plate blanks, seals, plugs, covers and even boxes can be manufactured from such cross-linked plastic materials. An example is illustrated in FIGS. 3a and 3b as well as in FIG. 4.

FIG. 3a schematically shows a pressing mold 20 including guide means 21. A plate-shaped semifinished product 22 is located in the pressing mold. The plate 22 can be heated in the pressing mold 20 or can be placed into the pressing mold in a preheated state. Under the action of a pressing ram 23 which, if desired, may also be preheated, the pressed shape is obtained as illustrated in FIG. 3b. The pressing ram 23 is removed only after cooling below the softening range of the cross-linked plastic material. In corresponding manner a tubular semifinished product 32 is shaped to a press fitting as shown in FIG. 4 by means of a pressing mold 30 bearing upon a working table 31 and a pressing ram 33. The pressing mold 30 is insulated from the working table 31 by means of a thermal insulation 35 and provided with throughflow passages 36 for heating and/or cooling media. Corresponding throughflow passages are provided in the pressing ram 33.

The shaping of preheated semifinished products made of thermoelastic cross-linked plastic material in a rolling mill is carried out, for example, in a section rolling mill of the conventional type of construction as shown in FIG. 5. For example, preheated band material 40 is infed into the section rolling mill and cooled below the softening range of the respectively used plastic material during the throughpassage. The band material 40 is withdrawn from a roll 41 and passed through the roll nip of two profiled rolls. In the exemplary embodiment schematically illustrated in FIG. 5, the band material 40 arrives through an infeed opening 42 at a widely closed housing 43 in which two endless roll chains 44 and 44' circulate at rolls 45 and 45' of which only the rolls on the infeed side are illustrated in FIG. 5. The endless roll chains 44 and 44' are offset from each other in the circulating direction such that an undulating structure is imparted to the band material 40 in the roll nip of the rolls 45 and 45'. This structure is retained because the thus deformed band material 40 is further conveyed between the endless roll chains 44 and 44'. After passage through the roll nip of the non-illustrated rolls on the outfeed side the now undulated band material 46 exits from the housing 43 through an outfeed opening 47. The rolls and also the housing 43 may be heated in a suitable manner such that the band material 40 is in the softened state substantially in the region of the rolls 45 and 45' on the infeed side but is no longer deformable in the region of the outfeed opening 47. In this manner, for example, differently profiled material can be obtained, for example, for mop-boards and the like.

Stretching of a band or foil made of cross-linked plastic material and heated to a temperature within its softening range is effected in a stretching unit of conventional type of construction either already during manufacture of foils or plates from the cross-linked polyolefin, see, for example, published European patent application No. 82,100,466.0, however, also can be carried out later using conventional stretching units such as rolls or the like. An example of a stretching unit which is known as such, is schematically illustrated in FIG. 6. The band-like semifinished product 50 is unwound from a roll 51 and deflected around three rolls 52, 53, 54 which are series-arranged in the throughpass direction, by 180° at the central roll 53 and by 90° at each one of the other two rolls. Following guide means 55 the band passes three correspondingly arranged deflection rolls 56, 57, 58 and is wound up on a further roll 59. The rolls 50 to 54, if desired, also the guide means 55 as well as the deflection rolls 56 to 58 are heated and the deflection rolls 56 to 58 are driven at higher speed than the rolls 52 to 54.

Figure 7:
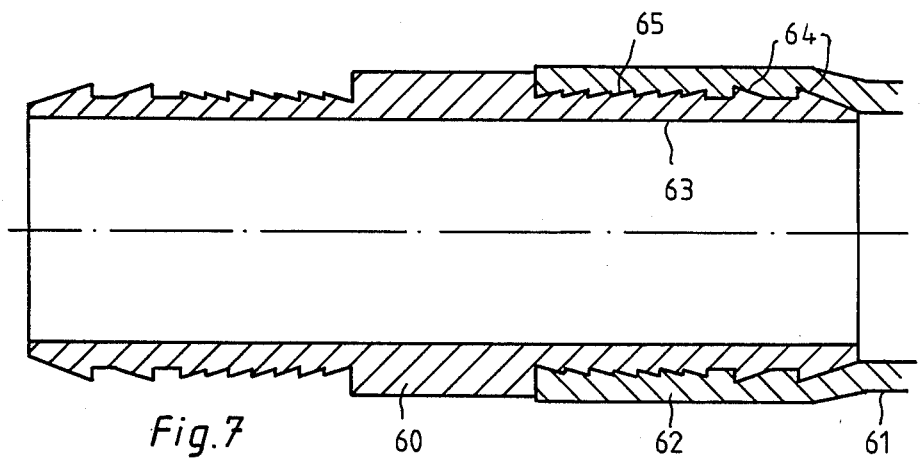
FIG. 7 a longitudinal section through a tube connection produced according to a sixth exemplary embodiment of the inventive method.

FIG. 7 shows a further exemplary embodiment of the method by means of which a tube connecting element 60 is connected with a tube 61 made of cross-linked high-density polyethylene. The tube 61 is heated in the region of its end 62 to temperatures in the range above the crystallite melting point, for example, 140° C. to 160° C. and pushed upon a tube connecting element 63 in the heated state. The tube connecting element 63 carries two hose stems 64 and further sealing elements 65. After cooling below the crystallite melting point the polyethylene tube 61 is firmly and sealingly connected with the tube connecting element 62.

The product which is obtained by heating, shaping and cooling experiences reversal to its original shape when heated to a temperature in the softening range of the plastic material. This reversal can be multiply utilized in advantageous manner. Thus, for example, openings or slots can be worked into a tube which has been subject to, for example, a widening by 50% during its manufacture. Into this shaped and widened tube there are worked, for example, lengthwise slots of 10 mm length and 0.2 mm width. During reheating to a temperature in the softening range these lengthwise slots are reduced to one half because the material re-forms its original shape. The advantage of this mode of operation resides in the fact that the openings or slots can be produced using greater and stronger tools which is particularly advantageous for relatively small openings which can be manufactured only by exposing correspondingly fine tools to high stresses. This is correspondingly true for all processing methods and processing tools required therefor. In this manner there can be produced filter elements, for example, for well pipes for which desired narrow filter openings cannot be produced directly or only with considerable difficulties because the high stiffness of the semifinished product results in an undesired high load on the fine tools used for processing the semifinished product.

Particularly advantageous is the use of sealing elements made of cross-linked polyolefins. Such sealing elements are separated, for example, punched out from, for example, foil- or plate-shaped semifinished material after calendering in conventional manner at temperatures above the crystallite melting point and cooling. Calendering results in a reduction in the cross-section. Sealing elements manufactured from such semifinished material have a particularly high sealing action at temperatures in the range of or above the crystallite melting point due to their tendency for reversal to the original cross-section.

I claim:

1. A method of processing thermoelastic cross-linked polyolefin, comprising the steps of:

selecting a tube made of a thermoelastic cross-linked polyolefin and heating said tube to a predetermined temperature range above the crystallite melting point of said thermoelastic cross-linked polyolefin;

shaping said heated tube and thereby imparting a preselected profile to said heated tube in said predetermined temperature range above said crystallite melting point of said thermoelastic cross-linked polyolefin; and cooling said heated and profiled tube to a temperature below said crystallite melting point of said thermoelastic cross-linked polyolefin.

2. The method as defined in claim 1, wherein: said step of shaping said heated tube comprises placing a preselected length of said heated tube into a mold containing corrugated walls;

said step of imparting said preselected profile to said heated tube comprises the step of blow molding said heated tube in said mold and thereby imparting a corrugated profile to said heated tube; and said step of cooling said shaped and heated tube comprises the step of cooling said profiled and heated tube in said mold to said temperature below said crystallite melting point of said cross-linked polyolefin.

3. The method as defined in claim 2, further including the steps of:

selecting as said tube a tube containing two ends and predetermined tube section between said two ends; and during said step of blow molding and imparting said corrugated profile to said heated tube, blow molding and imparting said corrugated profile to said predetermined tube section in said predetermined temperature range above said crystallite melting point of said thermoelastic cross-linked polyolefin in order to thereby obtain a tube section of increased flexibility.

4. The method as defined in claim 2, further including the steps of:

selecting as said tube a tube containing at least one end section; and during said step of blow molding and imparting said corrugated profile to said heated tube, blow molding and imparting said corrugated profile to said at lest one end section of said tube in said predetermined temperature range above said crystallite melting point of said thermoelastic cross-linked polyolefin in order to thereby obtain a tube connecting element in said at least one end section of said tube.

5. The method as defined in claim 1, wherein:

said step of heating said tube includes heating an end section of said tube;

said step of shaping and thereby imparting a preselected profile to said heated tube including the step of placing said heated end section of said tube onto a profiled tube connector; and, after said step of cooling said heated and profiled end section of said tube, said end section is thereby firmly and sealingly connected to said profiled tube connector.

6. A method of processing thermoelastic cross-linked material, comprising the steps of:

selecting as said thermoelastic cross-linked material, a tube made of thermoelastic cross-linked polyolefin;

heating said tube made of thermoelastic cross-linked polyolefin to a predetermined temperature range above the crystallite melting point of the thermoelastic cross-linked polyolefin;

placing a preselected length of said tube heated to said predetermined temperature range above said crystallite melting point, into a mold containing corrugated walls;

blow molding said preselected length of said tube in said mold and in said temperature range above said crystallite melting point and thereby imparting a corrugated profile to said preselected length of said tube heated to said temperature range above said crystallite melting point; and after profiling, cooling said profiled and heated preselected length of said tube to a temperature below said crystallite melting point of said thermoelastic cross-linked polyolefin.

7. A method of processing a thermoelastic cross-linked material, comprising the steps of:

selecting as said thermoelastic cross-linked material, a tube made of a thermoelastic cross-linked polyolefin and having an end section; heating said end section of said tube to a predetermined temperature range above the crystallite melting point of said thermoelastic cross-linked polyolefin;

placing said end section heated to said predetermined temperature range above said crystallite melting point, onto a profiled tube connector and thereby shaping and imparting a preselected profile complementary to said profile of said tube connector to said heated end section placed onto said tube connector in said predetermined temperature range above the crystallite melting point of said thermoelastic cross-linked polyolefin; and thereafter, cooling said heated and profiled end section below the crystallite melting point, thus firmly and sealingly connecting said profiled end section to said profiled tube connector.

* * * * *